March 29, 1966 M. S. BUROS ETAL 3,242,517

APPARATUS FOR CORRECTING ERRONEOUSLY-ENCODED DOCUMENTS

Filed June 1, 1964 4 Sheets-Sheet 1

INVENTORS
MELVIN S. BUROS
WAYNE L. HENDEE
FRED A. OHLINGER
BY McLaughlin & Cahill
ATTORNEYS March 29, 1966 M. S. BUROS ETAL 3,242,517

APPARATUS FOR CORRECTING ERRONEOUSLY-ENCODED DOCUMENTS

Filed June 1, 1964 4 Sheets-Sheet 2

INVENTORS
MELVIN S. BUROS
WAYNE L. HENDEE
FRED A. OHLINGER

BY McLaughlin & Cahill

ATTORNEYS

APPARATUS FOR CORRECTING ERRONEOUSLY-ENCODED DOCUMENTS

Filed June 1, 1964 4 Sheets-Sheet 3

INVENTORS
MELVIN S. BUROS
WAYNE L. HENDEE
FRED A. OHLINGER
BY McLaughlin & Cahill
ATTORNEYS

APPARATUS FOR CORRECTING ERRONEOUSLY-ENCODED DOCUMENTS

Filed June 1, 1964 4 Sheets-Sheet 4

INVENTORS
MELVIN S. BUROS
WAYNE L. HENDEE
FRED A. OHLINGER
BY McLaughlin & Cahill
ATTORNEYS

United States Patent Office 3,242,517

Patented Mar. 29, 1966

3,242,517
APPARATUS FOR CORRECTING ERRONEOUSLY-ENCODED DOCUMENTS

Melvin S. Buros, 411 N. Central Ave., Phoenix, Ariz., and Fred A. Ohlinger and Wayne L. Hendee, Phoenix, Ariz.; said Ohlinger and said Hendee assignors to said Buros Filed June 1, 1964, Ser. No. 371,567
15 Claims. (Cl. 15—77)

The present invention pertains to apparatus for removing erroneously-encoded characters on documents, and more specifically, for automatically removing magnetic ink character recognition characters that have erroneously been placed on documents ultimately intended for data processing use.

In modern information handling systems such as electronic data processing, it has become customary to store information on documents in the form of magnetic ink character recognition encoded characters. These characters, referred to as MICR characters, are used on documents such as bank checks. The encoded characters must be placed in a specific field on the document to enable automatic reading machinery to machine-read the information contained in the characters and appropriately handle the document and make the necessary records in reference to the account on which the document is drawn. The encoded characters are frequently in error and it thus becomes necessary to remove the erroneously-encoded characters; however, ordinary ink eradicating techniques are unavailing since the documents, such as checks, are legal documents containing certain information and which must conform to the standards of commercial codes and negotiable instrument law. Thus, ordinary eradicating techniques that deface the instrument by removing either water marks or destroying signatures or other written information thereon are unacceptable. Accordingly, a method for preventing erroneously encoded characters from being read by a document-reading system and entered into an account is described and claimed in Patent Number 3,112,151. The present invention pertains to the implementation of the method described in the above patent through means of a convenient automatic machine that correctly positions the field in which the encoding has been placed and removes the erroneously encoded information while subsequently delivering the document after the erroneously encoded characters have been removed.

Prior art machines intended for ink erradication or erasure use document handling techniques that are unsuited for legal instruments requiring careful handling and assurance against defacement. The application of a fluid to a document has heretofore been implemented in a manner that could cause valuable information to be removed from the document and defacement of the document to occur. Accordingly, it is an object of the present invention to provide apparatus for automatically removing erroneously encoded characters from a document.

It is a further object of the present invention to provide apparatus for insuring that only a specific field of a document encoding is removed.

It is another object of the present invention to provide apparatus that automatically remove erroneously-encoded characters from a designated field of a document and which is energized only upon correctly positioning of the document while de-energizing itself after delivery of the document from the machine to an operator.

Further objects of the present invention will become apparent to those skilled in the art as the description thereof proceeds.

Briefly, in accordance with one embodiment of the present invention, a pair of cylinders are mounted for counter-rotation and adapted to grip a document inserted therebetween to drive the document out of the apparatus. One of the cylinders is pivoted so that upon energization of an appropriate switch by the proper positioning of a document, the cylinder is pivoted toward a stationary cylinder thus gripping the document. A solvent pump is provided for delivering solvent from a supply to the appropriate predetermined area of the document such that the erroneously encoded characters are attacked by the solvent. A brush, that may be cylindrical in shape, is mounted on the same support as the movable cylinder, and encounters the predetermined area of the document to thereby remove the particles of those characters loosened by the solvent. The brush also performs the function of "wiping" solvent on the areas thereby insuring proper contact of the solvent with the characters to be removed. Therefore, when a document is placed in the apparatus, the cylinders grip the document and begin ejecting the document from the apparatus while the brush, operating in conjunction with the solvent being applied to the predetermined area, remove the erroneously-encoded characters as the document is being transported.

The present invention may thus be described by reference to the accompanying drawings in which.

Figure 1:
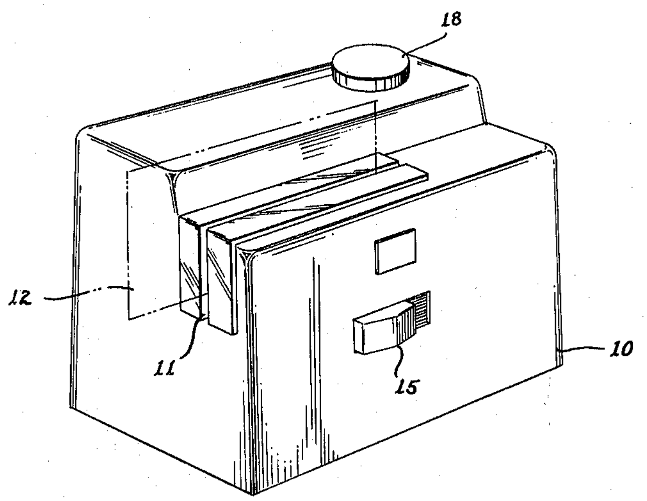
FIGURE 1 is an isometric view of a document-handling device constructed in accordance with the teachings of the present invention.
Figure 2:
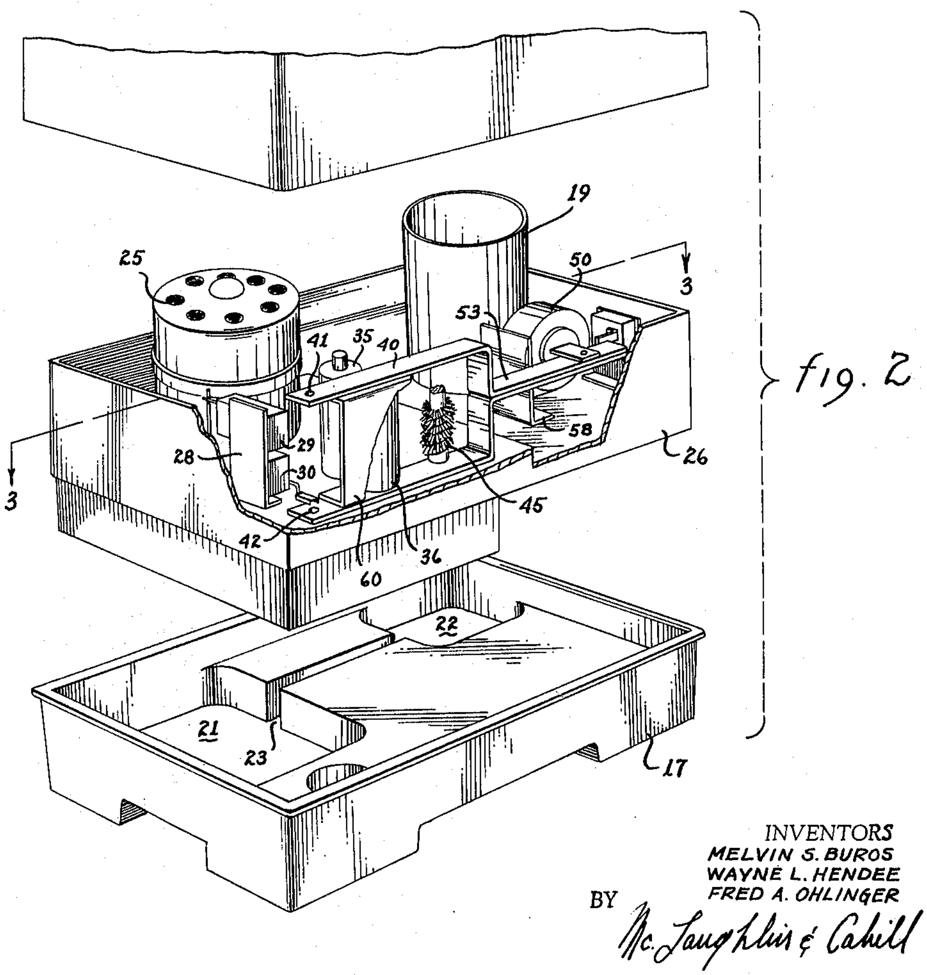
FIGURE 2 is an exploded isometric view, partly in section, of the device of FIGURE 1.

Referring now to FIGURES 1 and 2, the embodiment chosen for illustration includes a cover 10 formed of aluminum or other suitable material and includes a document-receiving station 11. The receiving station 11 may take the form of a slot for receiving and positioning a document 12 such as a bank check. A latch 15 locks the cover 10 to the machine base 17 and provides a handle to lift the cover 10 and associated mechanism from the base. A solvent container well cap 18 is detachably secured to the cover 10 and may be removed to gain access to a solvent container well 19. The base 17 includes solvent sumps 21 and 22 connected by a passageway 23. The sump 21 enables a solvent pump (not shown) to extend into the solvent contained in the sump, and sump 22 is positioned beneath the solvent container well 19 for reasons that will become apparent hereinafter. A suitable electric motor 25 is secured to a box-like platform 26, the latter serving as a support for the operating mechanism of the device of the present invention. A mounting tab 28 is secured to the platform 26 and provides support for micro switches 29 and 30, the functions of wihch will be described later. A cylinder 35 is journalled in the platform 26 and is driven through a suitable drive connection to the motor 25. A second cylinder 36 is journalled in a yoke 40. The yoke 40 is pivoted about an axis passing through pivot points 41 and 42 which permits the yoke 40 to be pivoted thereby enabling the cylinder 36 to move toward and away from the cylinder 35. A rotatable brush 45 is also mounted on the yoke 40 and is driven by the motor 25. The bracket 40 is pivoted about the axis passing through the pivot points 41 and 42 through energization of an electromagnetic device 50 having an armature 51 secured by an armature extension 52 to a yoke extension 53. The electromagnetic device (solenoid) is secured to the platform 26 by a solenoid mounting bracket 58.

A saddle 60 is secured to the yoke 40 to prevent solvent from being thrown against the inside of the cover 10.

Figure 3:
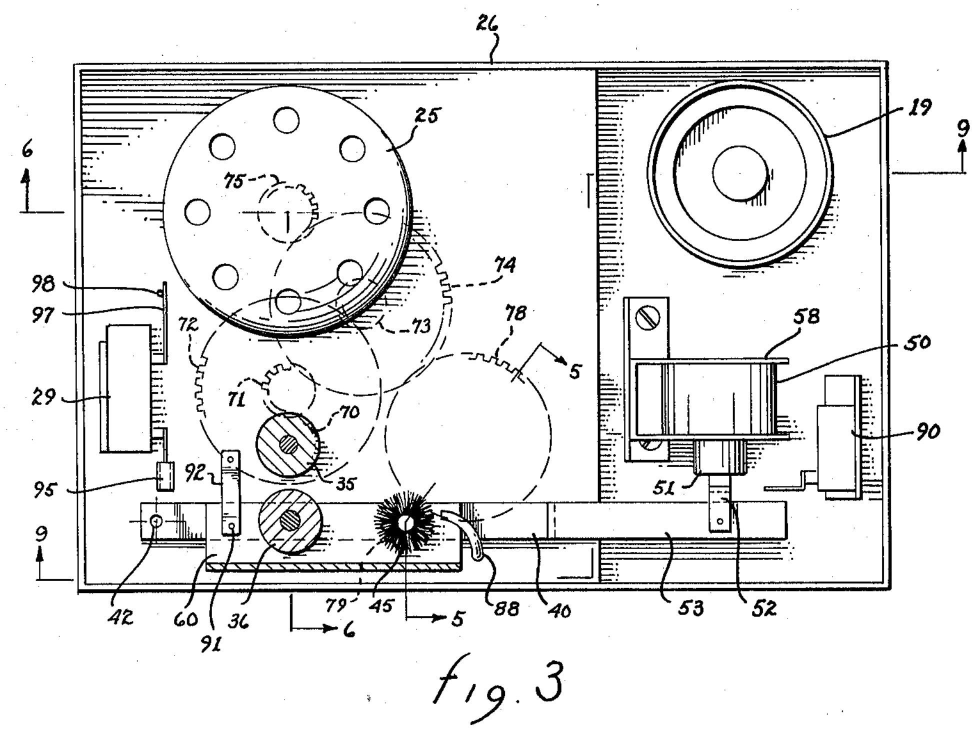
FIGURE 3 is a top view, partly in section, of a portion of the apparatus of FIGURE 2.
Figure 5:
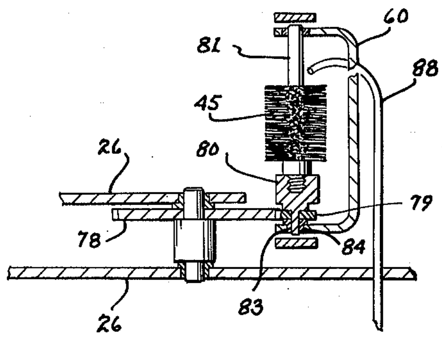
FIGURE 5 is a sectional view of a portion of FIGURE 3 taken along line 5—5.

Referring now to FIGURE 3, it may be seen that cylinder 35 is driven through a gear train comprising gears 71, 72, 73, 74 and 75, the latter gear being driven directly by connection through the armature of the motor 25. It may also be seen that the brush 45 is driven by a gear train comprising the gears 74, 75, 78, and 79. The saddle 60 is pivotally secured to the yoke 40 at the point at which the cylinder 36 is journalled to the yoke; thus, the cylinder 36 is journalled in both the saddle 60 and yoke 40, and the saddle 60 is pivotal about the axis of the cylinder 36. The brush 45 is journalled to the saddle 60 and, as may be seen by reference to FIGURE 5, is driven by the gear 78 and gear or pinon 79. A mounting stub 80 provides a means for securing the shaft 81 of the brush 45 thereto, and contains an extension 83 journalled in a bushing 84 secured to the saddle 60. A tube 88 is positioned adjacent the brush 45 and provides a means for directing solvents onto a document in a predetermined area as will be described more fully hereinafter.

Referring again to FIGURE 3, a microswitch 90 is provided as an electrical innerlock to permit the continued energization of the motor 25 and solenoid 50 during the time that a document is being ejected from the apparatus. The saddle 60 in addition to being pivotal about the axis of the cylinder 36, is also pivotal about a point 91 where the saddle 60 is secured to a strap 92; the opposite end of the strap 92 is secured to the platform 26. A triggering shoe 95 of the microswitch 30 is positioned to be contacted by a document that is inserted into the document-receiving station 11. The microswitch 29 includes an actuating arm 97 connected to a vertical extension 98 the opposite end of which is secured to a float for determining when the solvent has reached a dangerously low level in the sumps.

Figure 4:
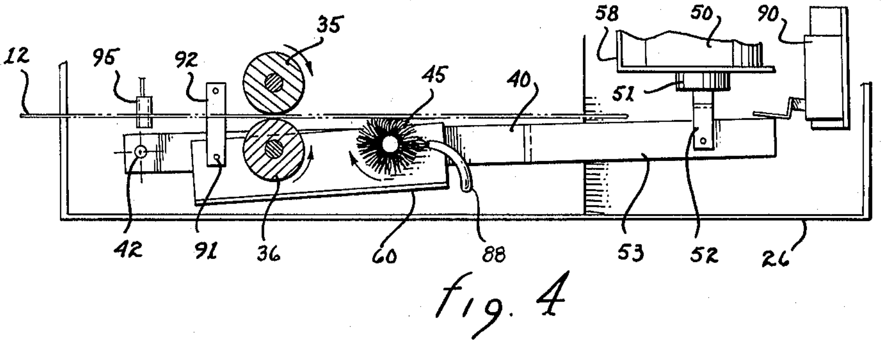
FIGURE 4 is a reproduction of a portion of FIGURE 3 showing various components in an operating position.

To more clearly demonstrate the operative relationships among various elements of FIGURE 3, reference is now made to FIGURE 4 which shows several of the elements of FIGURE 3 in an operating position. It may be noticed, by reference to FIGURE 4, that the solenoid 50 has been energized thus pivoting the yoke 40 counter-clockwise about the pivot 42. The energization of the solenoid 50 was caused by the document 12 being properly positioned in the document-receiving station and thus actuating microswitch 30 by contact with the shoe 95. (Two microswitches must be actuated by the document—only one of the switches is shown in FIGURE 4.) When the yoke 40 pivots counter-clockwise as indicated in FIGURE 4, the cylinder 36 forces the document 12 against cylinder 35. Since cylinder 35 is being driven by the now-energized electric motor 25, motion is imparted from the cylinder 35 to the document 12 and subsequently to the cylinder 36. Concurrently with the energization of the electric motor and driving of the cylinder 35, the brush 45 is driven in a clockwise direction. The brush travels a greater arcuate length than the cylinder 36 since the saddle 60, upon pivoting of the yoke 40, pivots about the axis of the cylinder 36 by reason of the fact that the pivot point 91 remains relatively stationary thus "amplifying" the angular motion imparted by the solenoid to the yoke 40. The brush is thus forced against the document and contacts the document in a predetermined area designated by the positioning of the brush and the required positioning of the document. When the yoke 40 is pivoted about the point 42, the yoke extension 53 trips the microswitch 90 to insure the continued actuation of the solenoid 50 and electric motor 25 even though the document is now being moved from the previously necessary position. The solenoid and electric motor will continue to be energized until the document 12 releases the shoe 95 of the microswitch 30 and permits the latter to move upwardly to trip the switch 30 thereby interrupting the electric circuit to both the solenoid 50 and the electric motor 25.

Figure 6:
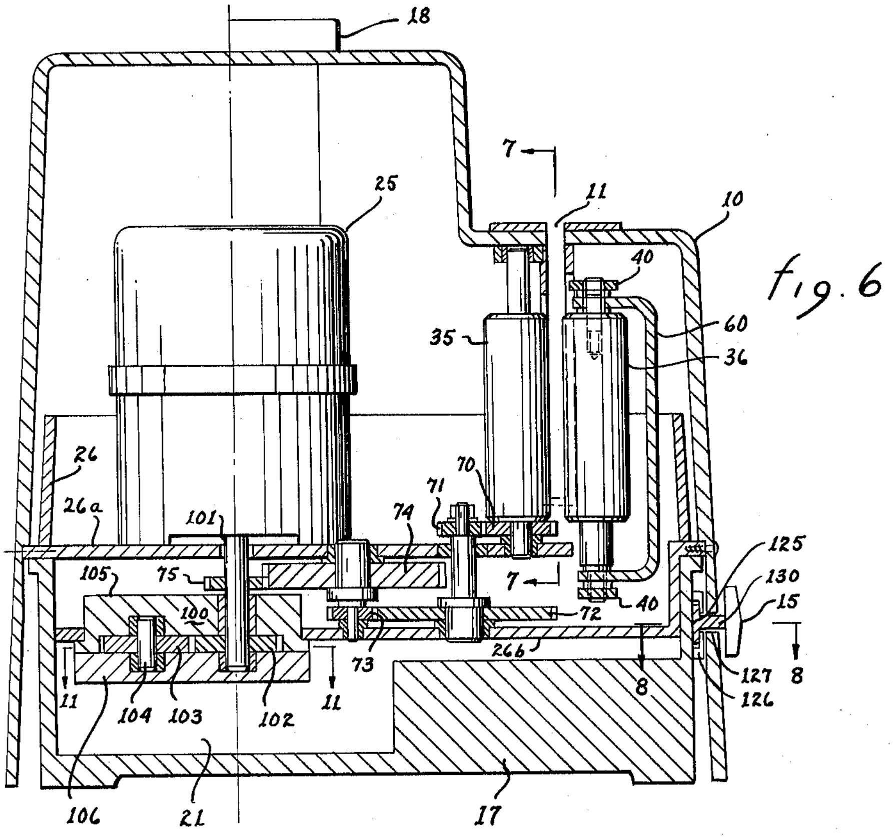
FIGURE 6 is a sectional view of a portion of FIGURE 3 taken along line 6—6.
Figure 11:
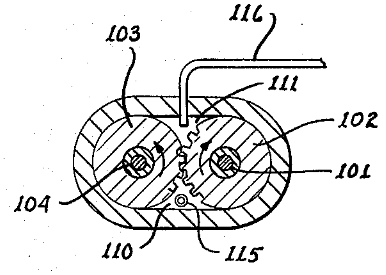
FIGURE 11 is a sectional view of a portion of FIGURE 6 taken along line 11—11.

Referring now to FIGURE 6, it may be seen that the platform 26 includes parallel spaced-apart plates **26*a* and 26*b* which form a "sandwich" between which gears 72, 73, 74, and 75 are mounted. In addition, the two plates 26*a* and 26*b* provide means for journalling the various gear shafts and also support a pump indicated generally in FIGURE 6 at 100. The motor shaft 101 extends downwardly and in addition to driving the gear 75 drives one gear 102 of the gear pump 100. The second gear 103 of the gear pump is secured to a shaft 104 of the gear pump which is journalled in the upper and lower halves 105 and 106 respectively of the pump 100. The pump may best be seen by reference to FIGURE 11 wherein it is shown that the gears 102 and 103 secured to shaft 101 and 104 respectively provide a means for forcing liquid solvent from the chamber 110 to the chamber 111 when the gears are rotating as indicated by the arrows in FIGURE 11. A supply tube 115 extending downwardly into the sump 21 provides fluid to the intake of the pump, and a tube 116 connects the chamber 111 to the fluid directing means or tube 88** (FIGURE 3).

Figure 8:
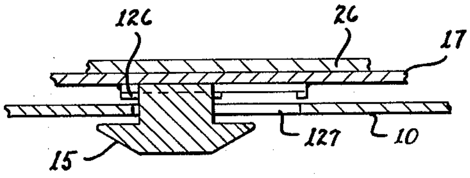
FIGURE 8 is a sectional view of a portion of FIGURE 6 taken along line 8—8.

Returning to FIGURE 6, the latch 15 is formed with an H cross-section having a portion 125 thereof slideably engaged within a track 126 secured to the base 17. The portion 125 is connected through an opening 127 by the horizontal portion 130 to the external portion 15 of the latch. The operation of the latch may best be seen by reference to FIGURE 8 wherein it is shown that the track 126 extends for approximately half of the width of the opening 127 provided in the case 10. Thus, when the latch 15 is in the position shown in FIGURE 8, the portion 125 within the shoe 126 locks the base 17 to the cover 10. When the latch is moved to the right, the portion 125 thereof is moved to a position that is non-interfering with the track 126 thus permitting the latch, and consequently the cover 10, to be moved upwardly and out of contact with the base 17. The platform 26 is secured to the cover 10 so that when the cover is removed from the base 17, the mechanism mounted on the platform 26 is removed with the cover, thereby permitting ready access to the solvent sumps for easy cleaning without interfering with the operating mechanism.

Figure 7:
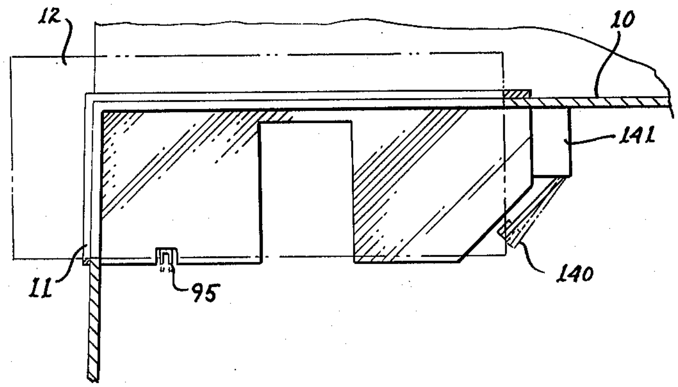
FIGURE 7 is a sectional view of a portion of FIGURE 6 taken along line 7—7.

Referring to FIGURE 7, a document 12 is shown inserted in the document-receiving station 11 provided in the device of the present invention. It may be seen that the document 12 engages the shoe 95 of the microswitch 30, thus tripping the latter, and also engages a switch arm 140 of a second microswitch 141. Thus, the document 12 must be positioned so that the lower edge thereof is in the appropriate position to trip microswitch 30 and the forward edge thereof must be inserted sufficiently into the document-receiving station 11 to enable the forward edge to trip the microswitch 141. If the document is not properly inserted, then either or both of the microswitches 30 and 141 will remain open, and the energization of the solenoid 50 and electric motor 25 will be prevented. As the document is ejected or moved to the left of FIGURE 7, the microswitch 141 is allowed to open; however, upon energization of the device of the present invention, the microswitch 90 (FIGURES 3 and 4) was closed by the motion of the yoke extension 53 thereby interlocking the electric circuit to permit the continued energization of the solenoid 50 and the electric motor 25 until the microswitch 30 opens (when the document is ejected from the device). The electrical circuitry connecting the microswitches 141, 30 and 90 is conventional and need not be explained here; however, it will be understood that other arrangements may be used to insure the proper orientation of the document in the document-receiving station prior to energization of the apparatus.

Figures 9, 10:
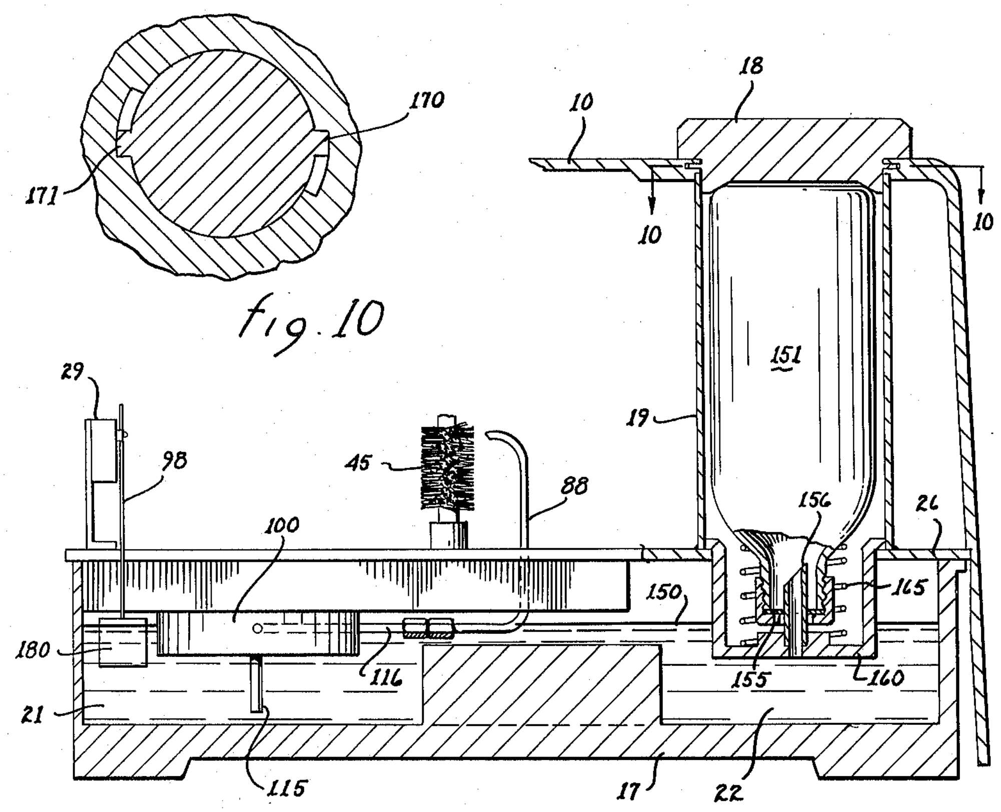
FIGURE 9 is an elevational view, in section of a portion, of the device of FIGURE 3 taken along line 9—9.
FIGURE 10 is a sectional view of a portion of the apparatus of FIGURE 9 taken along line 10—10.

The solvent-handling features of the present invention may best be described by reference to FIGURE 9. The solvent level, shown in FIGURE 9 at 150 is maintained in the sumps 21 and 22 and the passageway 23 by providing a solvent container 151 within the well 19. The container 151 is provided with a membrane 155 that is pierced by a tubular projection 156 extending upwardly from the bottom of the well 19. The tubular projection 156 communicates with the sump 22 thereby maintaining the liquid level in the sump 22 to at least the level even with the bottom surface 160 of the well. When the solvent level 150 extends below the surface 160, air is permitted to enter the container 151 allowing fluid to flow through the tube 156 into the sump. When the container 151 is empty, or when it is desired to remove the container, a coiled spring 165 urges the container upwardly against the well cap 18. When the well cap 18 is removed, the container 151 is urged upward so that it may readily be grasped and lifted from the well 19. To keep the container 151 in position against the force exerted by the coil spring 165, the well cap 18 is provided with locking tabs 170 and 171 that engages corresponding grooves as shown in FIGURE 10. Thus, the cap may be removed by a simple twist and the container 151 will be forced upwardly by the spring 165 into position to be grasped. To prevent the solvent from reaching a dangerously low level, a float 180 is provided and is connected to microswitch 29 through actuating arm 97 and actuating arm extension 98. Thus, when the solvent level is too low in the sump 21 for proper operation of the device, the float 180 will trip the microswitch 29 to thereby interrupt the electrical circuitry of the device and prevent its use until sufficient solvent has been supplied.

The operation of the device may be described as follows. The document to be corrected will have the erroneously encoded magnetic ink character recognition symbols on the document in a specified location. This predetermined area of the document determines the positioning of the brush 45 and the direction of the solvent to be applied to the document. The solvent is a solvent chosen in accordance with the teachings of the method of Patent Number 3,112,151 and is a solvent for the magnetic ink characters but is not a solvent for the water marks or other indicia on the face of the document. The document is inserted into the document-receiving station 11 and engages the shoe 95 (thus closing microswitch 30) and engages the arm 140 (thus closing microswitch 141). With switches 30 and 141 closed—assuming that the fluid level switch is closed—the motor 25 is energized thus driving cylinder 35 and brush 45. The solenoid 50 is also energized; however, the slight delay caused by the necessity of accelerating the mass of the solenoid armature and attached elements, enable the pump driven by the electrical motor 25 to begin supplying solvent from the sump 21 through the tube 115 to the tubes 116 and 88 and onto the predetermined area of the document before motion is imparted to the document. As the solenoid is energized, the yoke 40 is pivoted about the axis passing through the pivot points 41 and 42 thus forcing the cylinder 36, journalled in the yoke 40, against the document. The document is thus forced against the rotating cylinder 35 which imparts motion to the document and rotation to the cylinder 36. As the yoke 40 is pivoted counter-clockwise as shown in FIGURE 4, the pivotal motion is imparted to the saddle 60 which, since it is pivoted about the axis of the cylinder 36 and the point 91, causes the brush to pivot a greater distance and engage the predetermined area of the document that has been wetted and is being wetted by the solvent supplied through the tube 88. The rotation of the brush is opposite to the direction of motion of the document at its point of contact with the document. The slight movement of the brush 45 does not interfere with the drive of and brush through the gears 78 and 79 since the motion of the brush 45 has a component tangent to the gears 78 and 79 and is not of sufficient magnitude to interfere with gear operation. Simultaneously with the pivoting of the yoke 40, the yoke extension 53 closes switch 90 to override switch 141. Thus, the document 12 is moved and the motion imparted thereto begins ejecting the document from the apparatus. The document disengages the arm 140 of the switch 141 thus permitting the latter to open; however, switch 90 has already been closed thus overriding the effect of opening the switch 141. As the document is ejected from the document-receiving station of the apparatus, the solvent loosens particles on the magnetic ink characters and the brush effectively removes the loosened particles to thereby eliminate the erroneously encoded characters. The cylinders 35 and 36, being forced toward one another on opposite sides of the document 12, aid in the removing of any excess solvent remaining on the check after the document passes the brush 45. As the document is ejected from the document-receiving station, the shoe 95 is released and permitted to travel upwardly thus opening switch 30 and de-energizing the electrical motor 25 and the solenoid 50. When the solenoid 50 is de-energized, the solenoid armature is permitted to return to its extended position thus returning the yoke 40 and the saddle 60 to their "rest" positions. Simultaneously, a microswitch 90 is opened thus requiring the subsequent document to be properly aligned before re-energization of the apparatus of the present invention. The apparatus is thus in a deactivated state and in readiness to receive the next document.

While the present invention has been described above in terms of a specific embodiment, it will be apparent to those skilled in the art that many modifications may be made in the elements and arrangements of elements without departing from the spirit and scope of the present invention.

We claim:

1. Apparatus, for correcting an erroneously encoded document, comprising:
   (a) a document-receiving station including document transporting means responsive to document position for ejecting said document from said receiving station,
   (b) means for applying solvent to a predetermined area of said document, and
   (c) document-contacting means for contacting said predetermined area and removing particles loosened by said solvent.

2. Apparatus, for correcting an erroneously encoded document, comprising:
   (a) a document-receiving station including document transporting means responsive to document position for ejecting said document from said receiving station, said document transporting means comprising:
      (1) a pair of cylinders,
      (2) means for rotating one of said cylinders,
      (3) the other of said pair of cylinders mounted for movement toward and away from said one of said cylinders to grasp and transport documents positioned between said cylinders,
   (b) means for applying solvent to a predetermined area of said document, and (c) document-contacting means for contacting said predetermined area and removing particles loosened by said solvent.

3. Apparatus, for correcting an erroneously encoded document, comprising:

(a) a document-receiving station including document transporting means responsive to document position for ejecting said document from said receiving station, said document-transporting means comprising:
  (1) a pair of cylinders,
  (2) means for rotating one of said cylinders,
  (3) the other of said pair of cylinders mounted for movement toward and away from said one of said cylinders to grasp and transport documents positioned between said cylinders,
  (4) a pivoted yoke for supporting the other of said pair of cylinders,
  (5) electromagnetic means secured to said yoke for pivoting said yoke and causing, when energized, the other of said pair of cylinders to move toward said one of said pair of cylinders,
(b) means for applying solvent to a predetermined area of said document, and
(c) document-contacting means for contacting said predetermined area and removing particles loosened by said solvent.

4. Apparatus, for correcting an erroneously encoded document, comprising:

(a) a document-receiving station including document-transporting means responsive to document position for ejecting said document from said receiving station, said document-transporting means comprising:
  (1) a pair of cylinders,
  (2) means for rotating one of said cylinders in response to document position,
  (3) the other of said pair of cylinders mounted for movement toward or away from said one of said cylinders to grasp and transport documents positioned between said cylinders,
  (4) a pivoted yoke for supporting the other of said pair of cylinders,
  (5) electromagnetic means secured to said yoke for pivoting said yoke and causing, when energized, the other of said pair of cylinders to move toward said one of said pair of cylinders,
(b) means for applying solvent to a predetermined area of said document, and
(c) document-contacting means for contacting said predetermined area and removing particles loosened by said solvent.

5. Apparatus, for correcting an erroneously encoded document, comprising:

(a) a document-receiving station including document transporting means,
(b) means for applying solvent to a predetermined area of said document while said document is being transported comprising:
  (1) a source of solvent,
  (2) pump means responsive to document position for pumping said solvent from said source,
  (3) a tube connected to said pump for directing solvent onto a predetermined area of a document,
(c) document-contacting means for contacting said predetermined area and removing particles loosened by said solvent.

6. Apparatus, for correcting an erroneously encoded document, comprising:

(a) a document-receiving station including document transporting means responsive to document position for ejecting said document from said receiving station, said document transporting means comprising:
  (1) a pair of cylinders,
  (2) means for rotating one of said cylinders,
  (3) the other of said pair of cylinders mounted for movement toward and away from said one of said cylinders to grasp and transport document positioned between said cylinders,
(b) means for applying solvent to a predetermined area of said document comprising:
  (1) a source of solvent,
  (2) pump means for pumping said solvent from said source,
  (3) solvent-directing means connected to said pump for directing solvent onto a predetermined area of a document,
(c) document-contacting means for contacting said predetermined area and removing particles loosened by said solvent.

7. Apparatus, for correcting an erroneously encoded document, comprising:

(a) a document-receiving station including document-transporting means responsive to document position for ejecting said document from said receiving station, said document-transporting means comprising:
  (1) a pair of cylinders,
  (2) means for rotating one of said cylinders in response to document position,
  (3) the other of said pair of cylinders mounted for movement toward or away from said one of said cylinders to grasp and transport documents positioned between said cylinders,
  (4) a pivoted yoke for supporting the other of said pair of cylinders,
  (5) electromagnetic means secured to said yoke for pivoting said yoke and causing, when energized, the other of said pair of cylinders to move toward said one of said pair of cylinders,
(b) means for applying solvent to a predetermined area of said document while said document is being transported comprising:
  (1) a source of solvent,
  (2) pump means responsive to document position for pumping said solvent from said source,
  (3) a tube connected to said pump for directing solvent onto a predetermined area of a document,
(c) document-contacting means for contacting said predetermined area and removing particles loosened by said solvent.

8. Apparatus, for correcting an erroneously encoded document, comprising:

(a) a document-receiving station including document transporting means responsive to document position for ejecting said document from said receiving station, said document transporting means comprising:
  (1) a pair of cylinders,
  (2) means for rotating one of said cylinders,
  (3) the other of said pair of cylinders mounted for movement toward and away from said one of said cylinders to grasp and transport documents positioned between said cylinders,
(b) means for applying solvent to a predetermined area of said document, and
(c) document-contacting means for contacting said predetermined area and removing particles loosened by said solvent comprising:
  (1) a brush,
  (2) means secured to said brush for moving said brush into and out of contact with said predetermined area of said document.

9. Apparatus, for correcting an erroneously encoded document, comprising:

(a) a document-receiving station including document-transporting means responsive to document position for ejecting said document from said receiving station, said document-transporting means comprising:
  (1) a pair of cylinders,
  (2) means for rotating one of said cylinders in response to document position, (3) the other of said pair of cylinders mounted for movement toward and away from said one of said cylinders to grasp and transport documents positioned between said cylinders,
(b) means for applying solvent to a predetermined area of said document, and
(c) document-contacting means for contacting said predetermined area and removing particles loosened by said solvent comprising:
(1) a cylindrical brush mounted for rotation about an axis parallel to the surface of said document,
(2) means secured to said brush for moving said brush into and out of contact with said predetermined area of said document.

10. Apparatus, for correcting an erroneously encoded document, comprising:
(a) a document-receiving station including document-transporting means responsive to document position for ejecting said document from said receiving station, said document-transporting means comprising:
(1) a pair of cylinders,
(2) means for rotating one of said cylinders in response to document position,
(3) the other of said pair of cylinders mounted for movement toward or away from said one of said cylinders to grasp and transport documents positioned between said cylinders,
(4) a pivoted yoke for supporting the other of said pair of cylinders,
(5) electromagnetic means secured to said yoke for pivoting said yoke and causing, when energized, the other of said pair of cylinders to move toward said one of said pair of cylinders,
(b) means for supplying solvent to a predetermined area of said document, and
(c) document contacting means for contacting said predetermined area and removing particles loosened by said solvent comprising:
(1) a cylindrical brush mounted for rotation about an axis parallel to the surface of said document,
(2) means comprising a saddle pivotally mounted on said yoke and secured to said brush for moving said brush into and out of contact with said predetermined area of said document,
(3) means for rotating said brush.

11. Apparatus, for correcting an erroneously encoded document, comprising:
(a) a document-receiving station including document-transporting means responsive to document position for ejecting said document from said receiving station, said document-transporting means comprising:
(1) a pair of cylinders,
(2) means for rotating one of said cylinders in response to document position,
(3) the other of said pair of cylinders mounted for movement toward and away from said one of said cylinders to grasp and transport documents positioned between asid cylinders,
(b) means for applying solvent to a predetermined area of said document, and
(c) document-contacting means for contacting said predetermined area and removing particles loosened by said solvent comprising:
(1) a cylindrical brush mounted for rotation about an axis parallel to the surface of said document,
(2) means secured to said brush for removing said brush into and out of contact with said predetermined area of said document,
(3) means for rotating said brush while simultaneously transporting said document and directing solvent onto said predetermined area.

12. Apparatus, for correcting an erroneously encoded document, comprising:
(a) a document-receiving station including document transporting means responsive to document position for ejecting said document from said receiving station,
(b) means for applying solvent to a predetermined area of said document comprising:
(1) a source of solvent,
(2) pump means for pumping said solvent from said source,
(3) solvent-directing means connected to said pump for directing solvent onto a predetermined area of a document,
(c) document-contacting means for contacting said predetermined area and removing particles loosened by said solvent comprising:
(1) a cylindrical brush mounted for rotation about an axis parallel to the surface of said document,
(2) means secured to said brush for removing said brush into and out of contact with said predetermined area of said document,
(3) means for rotating said brush while simultaneously transporting said document and directing solvent onto said predetermined area.

13. Apparatus, for correcting an erroneously encoded document, comprising:
(a) a document-receiving station including document transporting means responsive to document position for ejecting said document from said receiving station,
(b) means for applying solvent to a predetermined area of said document while said document is being transported comprising:
(1) a source of solvent,
(2) pump means responsive to document position for pumping said solvent from said source,
(3) a tube connected to said pump for directing solvent onto a predetermined area of a document,
(c) document-contacting means for contacting said predetermined area and removing particles loosened by said solvent comprising:
(1) a cylindrical brush mounted for rotation about an axis parallel to the surface of said document,
(2) means secured to said brush for removing said brush into and out of contact with said predetermined area of said document,
(3) means for rotating said brush while simultaneously transporting said document and directing solvent onto said predetermined area.

14. Apparatus, for correcting an erroneously encoded document, comprising:
(a) a document-receiving station including document-transporting means responsive to document position for ejecting said document from said receiving station, said document-transporting means comprising:
(1) a pair of cylinders,
(2) means for rotating one of said cylinders in response to document position,
(3) the other of said pair of cylinders mounted for movement toward or away from said one of said cylinders to grasp and transport documents positioned between said cylinders,
(4) a pivoted yoke for supporting the other of said pair of cylinders,
(5) electromagnetic means secured to said yoke for pivoting said yoke and causing, when energized, the other of said pair of cylinders to move toward said one of said pair of cylinders,
(b) means for applying solvent to a predetermined area of said document while said document is being transported comprising:
(1) a source of solvent,
(2) pump means responsive to document position for pumping said solvent from said source, (3) a tube connected to said pump for directing solvent onto a predetermined area of a document, (c) document contacting means for contacting said predetermined area and removing particles loosened by said solvent comprising:

(1) a cylindrical brush mounted for rotation about an axis parallel to the surface of said document, (2) means comprising a saddle pivotally mounted on said yoke and secured to said brush for moving said brush into and out of contact with said predetermined area of said document, (3) means for rotating said brush.

15. Apparatus, for correcting an erroneously encoded document, comprising:

(a) a document-receiving station including document transporting means responsive to document position for ejecting said document from said receiving station, (b) means for applying solvent to a predetermined area of said document while said document is being transported, and (c) document-contacting means for contacting said predetermined area and removing particles loosened by said solvent.

References Cited by the Examiner

UNITED STATES PATENTS

| | | | |
|---|---|---|---|
| 1,633,216 | 6/1927 | Lakeman | 15—77 |
| 1,817,332 | 8/1931 | Worrall | 15—77 |
| 2,439,305 | 4/1948 | Johnson | 15—77 |
| 3,093,852 | 6/1963 | Madge | 15—77 |

CHARLES A. WILLMUTH, *Primary Examiner.*

EDWARD L. ROBERTS, *Assistant Examiner.*